(12) United States Patent
Lottin et al.

(10) Patent No.: US 8,498,398 B2
(45) Date of Patent: Jul. 30, 2013

(54) METHOD AND SYSTEM FOR MANAGING A CALLER'S TELEPHONE CALL TO A CALLED PARTY

(75) Inventors: Philippe Lottin, Trebeurden (FR); Laura Carlier, Perros Guirec (FR); Francois Toutain, Iouannec (FR)

(73) Assignee: France Telecom, Paris (FR)

( * ) Notice: Subject to any disclaimer, the term of this patent is extended or adjusted under 35 U.S.C. 154(b) by 1444 days.

(21) Appl. No.: 11/791,817

(22) PCT Filed: Nov. 16, 2005

(86) PCT No.: PCT/FR2005/002845
§ 371 (c)(1),
(2), (4) Date: Mar. 18, 2008

(87) PCT Pub. No.: WO2006/058977
PCT Pub. Date: Jun. 8, 2006

(65) Prior Publication Data
US 2009/0022290 A1     Jan. 22, 2009

(30) Foreign Application Priority Data

Nov. 30, 2004  (FR) ..................................... 04 12714

(51) Int. Cl.
*H04M 3/42*    (2006.01)
(52) U.S. Cl.
USPC ................ 379/211.02; 379/88.13; 379/88.18; 379/88.22
(58) Field of Classification Search
USPC ................ 379/210, 88.12, 88.23, 213, 88.13, 379/88.18, 88.22, 211.02
See application file for complete search history.

(56) References Cited

U.S. PATENT DOCUMENTS

| | | | |
|---|---|---|---|
| 5,471,519 A * | 11/1995 | Howe et al. | 379/88.26 |
| 6,014,436 A * | 1/2000 | Florence et al. | 379/211.01 |
| 2002/0064149 A1* | 5/2002 | Elliott et al. | 370/352 |
| 2004/0234050 A1 | 11/2004 | Muller | |
| 2004/0264653 A1* | 12/2004 | Revisky et al. | 379/88.12 |
| 2005/0111635 A1* | 5/2005 | Caputo et al. | 379/88.22 |

FOREIGN PATENT DOCUMENTS

| | | |
|---|---|---|
| JP | 08-019015 | 1/1996 |
| JP | 09-331396 | 12/1997 |
| WO | WO 00/07350 | 2/2000 |
| WO | WO 2004/093422 A1 | 10/2004 |

* cited by examiner

*Primary Examiner* — Simon Sing
*Assistant Examiner* — Simon King
(74) *Attorney, Agent, or Firm* — Knobbe Martens Olson & Bear LLP (57) ABSTRACT

The invention concerns a method of managing a telephone call from a caller (B) to a person being called, in which the non-reply of the person being called (A) to the telephone call during a predetermined length of time is detected, a communication is established between the caller and a non-reply server (130) for transferring at least one message intended for the caller while maintaining the telephone call from the caller to the person being called, the response of the person being called (A) to the telephone call from the caller is detected and, if the response of the person being called to the telephone call is detected, the communication between the caller and the non-reply server is interrupted and communication is established between the caller and the person being called. The invention also concerns the associated system.

8 Claims, 3 Drawing Sheets

FIG. 1

METHOD AND SYSTEM FOR MANAGING A CALLER'S TELEPHONE CALL TO A CALLED PARTY

BACKGROUND OF THE INVENTION

The present invention concerns a method and system for managing a telephone call from a caller to a person being called when there is no reply from the person being called.

Services that offer to a subscriber the facility of transferring a telephone call intended for him to a messaging server when the subscriber does not reply to the call during a certain lapse of time are known.

The subscriber can choose the number of rings generated by his telephone set before the call is redirected to the messaging server.

These services, although certainly practical, are not suited to all situations in which telephone users find themselves. This is because it often happens that a subscriber to such services, although situated close to his telephone set, cannot take a call before the call is redirected to a messaging server. This is a particular nuisance when the caller must communicate important information to the subscriber to such a service.

SUMMARY OF THE INVENTION

The aim of the invention is to resolve the aforementioned drawbacks by proposing a method of managing a telephone call from a caller to a person being called, characterised in that the message comprises the successive steps of:
  detecting the non-reply of the person being called to the telephone call during a predetermined length of time,
  establishing a communication between the caller and a non-reply server for transferring at least one message intended for the caller and maintaining the telephone call from the caller to the person being called,
  detecting the reply of the person being called to the telephone call from the caller,
if the reply of the person being called to the telephone call is detected,
  interrupting the communication between the caller and the non-reply server,
  establishing communication between the caller and the person being called.

Correspondingly, the invention proposes a system for managing a telephone call from a caller to a person being called, characterised in that the system comprises:
  means of detecting the non-reply of the person being called to the telephone call during a predetermined length of time,
  means of establishing communication between the caller and a non-reply server for transferring at least one message intended for the caller and maintaining the telephone call from the caller to the person being called,
  means of detecting the reply of the person being called to the telephone call from the caller,
  means of interrupting the communication between the caller and the non-reply server if the reply by the person being called to the telephone call is detected,
  means of establishing communication between the caller and the person being called.

Thus, by maintaining the call to the person being called when communication is established between the caller and the non-reply server, the person being called always has the possibility of taking the communication.

According to another aspect of the invention, the message is a multimedia message inviting the caller to continue to present the call to the caller and/or to leave a message in the message box of the person being called and/or to effect an automatic call back to the person being called and/or to transfer the telephone call to another telephone terminal.

Thus the caller can, according to the importance of the call or the urgency thereof, maintain the call or perform other operations.

According to another aspect of the invention, the message is adapted to the identity of the caller and/or to the date and/or time at which the call is made and/or to a service to which the person being called has subscribed.

Thus the person being called can personalise the messages transmitted when he does not reply to the telephone and adapt these to the time of the telephone call.

According to another aspect of the invention, the non-reply server detects a reply by the caller to the said message.

According to another aspect of the invention, if the reply by the caller represents an acceptance to continue to present the call to the caller, the communication between the caller and the non-reply server is interrupted.

Thus the caller can maintain the call.

According to another aspect of the invention, if the reply by the caller represents an acceptance to leave a message in the message box of the person being called, the communication between the caller and the non-reply server is interrupted and communication is established between the caller and another non-reply server, referred to as the messaging server, with which the person being called is associated.

Thus the caller can leave a message on the voice messaging of the person being called in parallel with the call to the person being called.

The invention also concerns the computer programs stored on an information medium, the said programs containing instructions for implementing the method described above, when they are loaded into and executed by one or more computer systems.

BRIEF DESCRIPTION OF THE DRAWINGS

The characteristics of the invention mentioned above, as well as others, will emerge more clearly from a reading of the following description of an example embodiment, the said description being made in relation to the accompanying drawings, among which.

Figure 1:
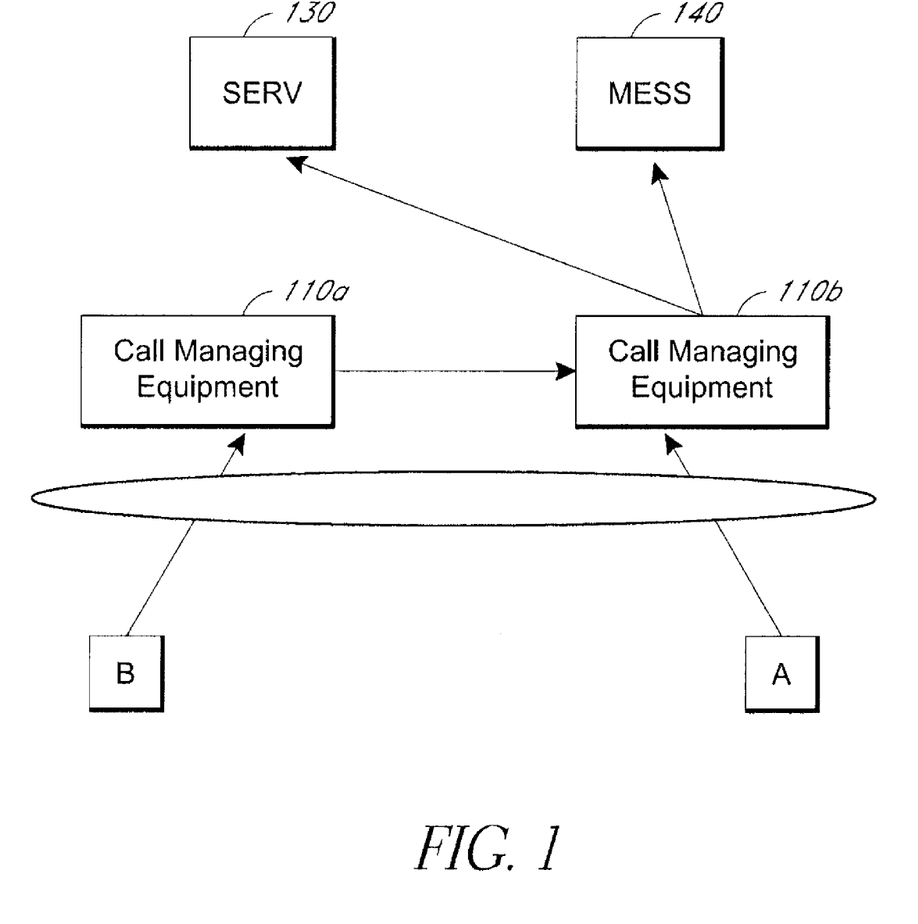
FIG. 1 depicts a telecommunication system able to manage a telephone call from a caller to a person being called when the caller does not reply according to the present invention.

The telecommunication system in FIG. 1 is a telecommunication system making it possible to establish telephone conversations between two users A and B. The telephone communication is established between the two users by means of the IP network 180 and call management equipment 110a and 110b. This type of network is known by the term NGN network, the acronym for 'Next Generation Networks.' Only two users A and B are shown in FIG. 1. Naturally a larger number of users are connected to such a telecommunication system.

Call managing equipment 110 is for example a gatekeeper (or 'Gatekeeper' in English) in accordance with the ITU standard H.323. The call managing equipment 110a manages the H.323 terminals of the user B as well as other user terminals not shown in FIG. 1. The call managing equipment 110b manages the H.323 terminals of the user A as well as other user terminals not shown in FIG. 1.

When the user B, or caller, wishes for a telephone communication to be established with another user, for example the user A or person being called A, the user B sends a request for admission to the call managing equipment 110a and communicates to it an identifier of the user A, for example his E.164 identifier or his email address. The call managing equipment 110a decides or not whether the call is authorised and in the affirmative returns the IP address of the H.323 terminal to the user A. The call managing equipment 110a generates a connection request intended for the call manager 110b with which the user A is associated, which then transfers this request to the H.323 terminal of the person being called A. When such a message is received, the H.323 terminal of the person being called A then generates a call signal for the user A such as for example a ringing then transfers a message representing the call signal to the H.323 terminal of the caller B by means of the call managing equipment 110.

When the person being called A takes the telephone communication, a message representing the off-hooking is then transferred by the H.323 terminal of the person being called A to the H.323 terminal of the caller B by means of the call managing equipment 110. In response, the H.323 terminal of the person being called B transfers to the H.323 terminal of the caller A an acknowledgment message by means of the call managing equipment 110. The telephone conversation is then established between the two users A and B.

According to the invention, when the connection request is received, the call managing equipment 110b of the person being called A triggers a time delay. This time delay is deactivated on reception of the message representing the off-hooking transferred by the H.323 terminal of the person being called A. If the message representing the off-hooking is not received during this time delay, the call managing equipment 110b of the person being called A generates a request for connection to a non-reply management server 130. On reception of an acknowledgment message from the non-reply management server 130, the call managing equipment 110b generates a message indicating a non-reply session establishment to the terminal of the caller B. When this message is acknowledged by the H.323 terminal of the caller B the latter is connected with a non-reply management server 130. The non-reply management server 130 is able, in accordance with the present invention, to transfer to the caller B multimedia messages such as audio and/or text messages inviting the caller B to maintain his call or redirect it to another terminal or to another non-reply server such as a messaging server 140, as will be explained in more detail with regard to FIG. 2. The messaging server 140 is able to store a voice message intended for the person being called A. It should be noted here that, according to the invention, the H.323 terminal of the person being called A continues to generate a call signal for the user A as long as the caller B is in communication with the non-reply management server 130.

It should be noted here that, in a variant, either the call managing equipment 110 of the caller, or the call managing equipment 110a according to the previous example, executes, in place of the call managing equipment 110b of the person being called, the steps of triggering time delay and redirection of the caller B to the non-reply management server 130 in a similar manner to that which will be described in FIG. 2.

It should be noted here that FIG. 1 shows a system based on a network in which the H.323 standard is used. Naturally other protocols, such as for example the SIP protocol proposed by the IETF, can also be used. SIP is the acronym for 'Session Initiation Protocol.' In this case, the call managing equipment 110b is included in a SIP proxy server.

Likewise the present invention is situated in another embodiment based on telephone networks of the analogue and/or digital type. In this embodiment, the call managing equipment 110b is included in the switch that provides the telephone service to the person being called A. This switch is able to put the caller B in communication with a non-reply management server, or even a messaging server 140.

Figures 2, 2B:
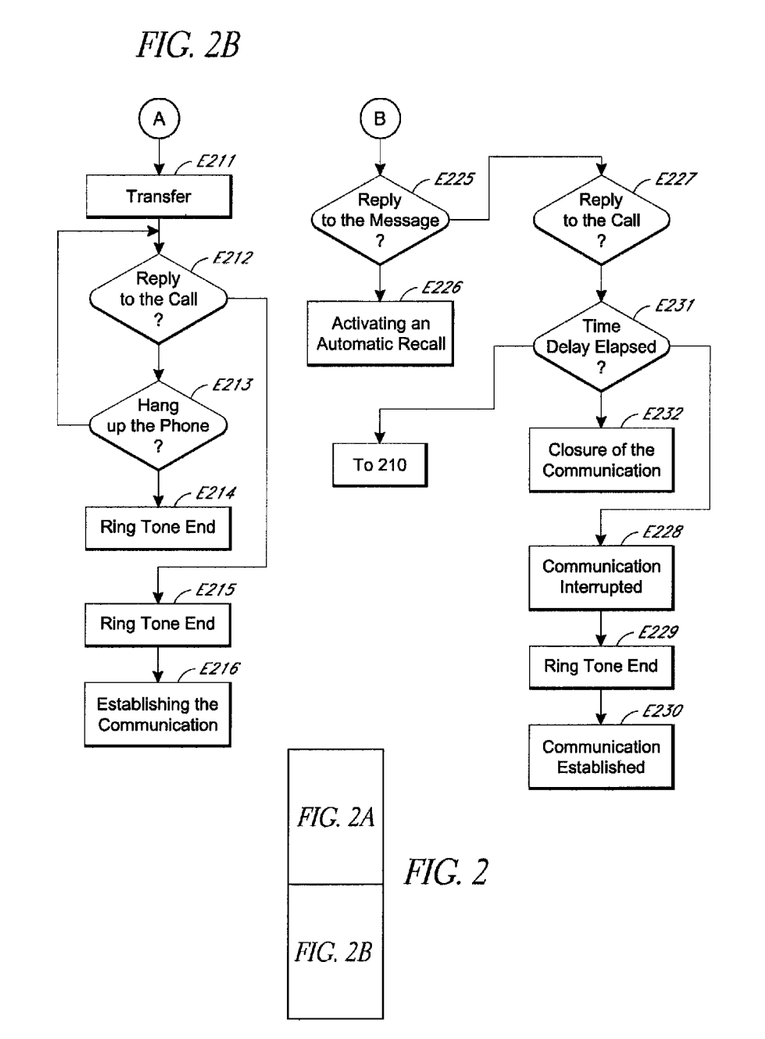
FIG. 2 depicts the algorithm for managing a telephone call from a caller to a person being called when the person does not reply according to the present invention.
Figure 2A:
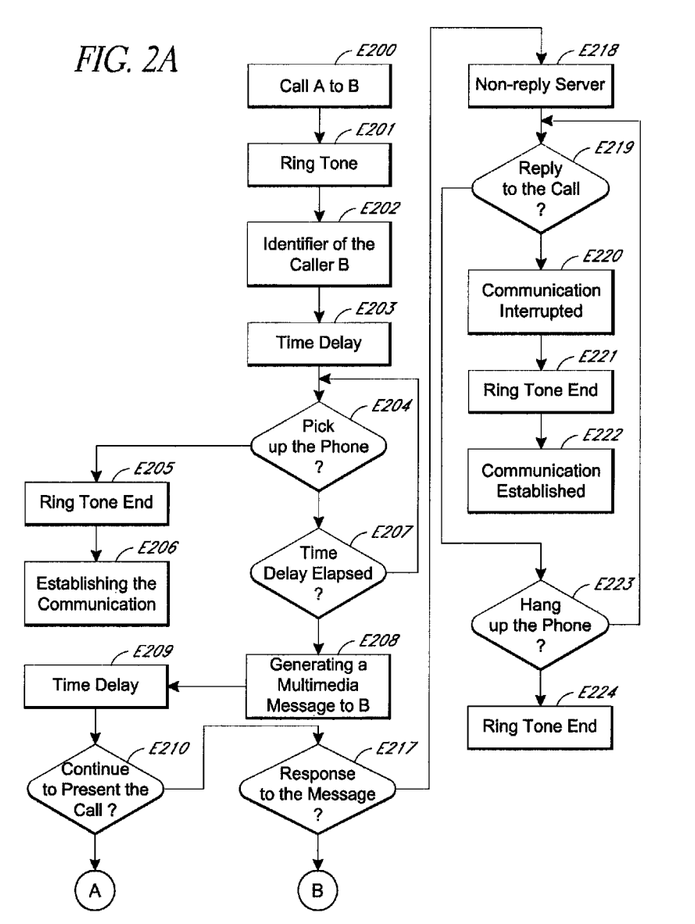

FIG. 2 shows the algorithm for managing a telephone call from a caller to a person being called when the person being called does not reply, according to the present invention.

Step E200 consists of the detection, by the call management equipment 110b, of a telephone call made by the user B and intended for the user A.

When the present invention is based on a network in which the H.323 standard is used, the user B sends an admission request to the call managing equipment 110a and communicates to it an identifier of the user A. The call managing equipment 110a generates a connection request intended for the call manager 110b with which the user A is associated, which then transfers this request to the H.323 terminal of the person being called A.

When the present invention is based on an analogue telephone network, the caller B dials the telephone number of the person being called A, the switch to which the caller B is connected establishes a connection with the switch to which the person being called A is connected.

The following step E201 consists of generating a call signal for the user A.

When the present invention is based on a network in which the H.323 standard is used, the H.323 terminal of the user A, when the connection request is received, then generates a call signal for the user A such as for example a ringing and then transfers a message representing the call signal to the H.323 terminal of the caller B by means of the call managing equipment 110.

When the present invention is based on an analogue telephone network, the switch to which the user A is connected and which comprises call managing equipment 110b such as that in accordance with the present invention, generates a call signal to the terminal of the user A, which, when it is received, generates a call signal for the user A, such as a ringing.

At step E202, the call managing equipment 110b stores an identifier of the caller B. This identifier is the telephone number of the caller B when the invention is implemented in an analogue telephone network or the IP address of the caller B when the invention is implemented in a network of the H.323 type.

At step E203, the call managing equipment 110b triggers a time delay denoted T1.

At step E204, the call managing equipment 110b checks whether the person being called A has taken the telephone communication.

When the present invention is based on a network in which the H.323 standard is used, the call managing equipment 110b checks whether a message representing the off-hooking has been transferred by the H.323 terminal of the person being called A.

When the present invention is based on an analogue telephone network, the switch to which the user A is connected and which comprises the call managing equipment 110*b* detects the establishment of a current loop with the terminal of the person being called A.

If the person being called A has taken the telephone communication, the algorithm passes to the following step E205, which consists of stopping the call signal of the person being called A.

When the present invention is based on an analogue telephone network, the switch to which the person being called A is connected demands the stopping of the call signal.

When the present invention is based on a network in which the H.323 standard is used, the H.323 terminal of the person being called A demands the stopping of the call signal.

When this operation has been performed, the users A and B are connected at step E206, communication is thus established between the users A and B, and the algorithm according to the present invention stops and awaits a new telephone call.

If the person being called A has not taken the communication, the call managing equipment 110*a* checks whether the time delay T1 triggered at step E203 has elapsed.

If not, steps E204 and E207 are reiterated as long as the time delay T1 has not elapsed.

When the time delay has elapsed before the person being called A has taken the communication, the call managing equipment 110*a* passes to step E208.

Step E208 consists of generating a multimedia messaging intended for the caller B.

When the present invention is based on a network in which the H.323 standard is used, the call managing equipment 110*b* of the person being called A generates a request for connection to the non-reply management server 130. On reception of an acknowledgment message from the non-reply management server 130, the call managing equipment 110*b* of the person being called A generates a non-reply session indication message to the terminal of the caller B, a session established in parallel with the call from the caller B to the person being called A. When this message is acknowledged by the H.323 terminal of the caller B, the latter is connected with the non-reply management server 130 in parallel with the call to the person being called A.

When the present invention is based on an analogue telephone network, the switch with which the person being called A is associated establishes, in parallel with the call to the user A, communication between the caller B and the non-reply management server 130.

It should be noted here that, according to the invention, when the present invention is based on an analogue telephone network, the switch to which the person being called A is connected continues to generate the call signal. When the present invention is based on a network in which the H.323 standard is used, the H.323 terminal of the person being called A continues to generate the call signal.

The non-reply management server 130 is, in accordance with the present invention, able to transfer to the caller B at least one audio and/or text multimedia message.

The non-reply management server 130 generates a multimedia message to the caller B inviting the latter to make a choice between a set of proposals. These proposals are for example, and non-limitingly, an invitation to continue to present the call from the person being called A, leave a message in the messaging service of the person being called A, make an automatic call back to the person being called A, transfer the call to another terminal such as for example the mobile telephone of the person being called A or the secretariat of the person being called A, or access other options.

It should be noted here that the multimedia message is adapted to predetermined conditions. These predetermined conditions are for example and non-limitingly, the identity of the caller B obtained at step E202 and/or the date or time of the processing of the call, or the service or services to which the person being called A has subscribed with the operator of the telecommunication system. This is because the person being called A can define these conditions by accessing the non-reply management server 130 by means of his H.323 terminal or by means of his computer connected to the Internet.

At the following step E209, the non-reply management server 130 activates a time delay T2.

At the following step E210, the non-reply management server 130 checks whether the caller B has replied to the multimedia message transmitted at step E208, by selecting the invitation to continue to present the call to the person being called A. The response of the caller B is for example pressing on a predetermined key on his H.323 terminal, which demands the transfer of a signal of the DTMF type or the like to the non-reply management server or a voice command interpreted by the non-reply management server 130.

In the affirmative, the algorithm passes to the following step E211.

At this step, when the present invention is based on a network in which the H.323 standard is used, the non-reply management server 130 transfers to the call management equipment 110*b* of the person being called A a message representing the closure of the non-reply session. The call management equipment 110*b* transfers in response a message representing the closure of the non-reply session to the H.323 terminal of the caller B.

When the present invention is based on an analogue telephone network, the communication between the caller B and the non-reply management server 130 is interrupted and the caller B is once again in the call procedure as well as the person being called A.

At the following step E212 the call management equipment 110*b* of the person being called A checks whether the person being called A has taken the telephone communication.

The check is carried out in the same way as that described previously at step E204 and will not be described further.

If the person being called A has taken the telephone communication, the algorithm passes to the following step E215, which consists of stopping the call signal for the person being called A.

When the present invention is based on an analogue telephone network, the switch to which the person being called A is connected demands the stopping of the call signal.

When the present invention is based on a network in which the H.323 standard is used, the 9.323 terminal of the person being called A demands the stopping of the call signal.

Once this operation has been performed, the users A and B are connected at step E216. Communication is thus established between the users A and B. The algorithm according to the present invention stops and awaits a new telephone call.

If the person being called A has not taken the communication, the call managing equipment 110*b* passes from step E212 to step E213 and checks whether the caller B has interrupted the communication.

When the present invention is based on an analogue telephone network, the switch to which the caller B is connected detects on-hooking of the telephone set of the person being called A and transfers a message to the switch to which the person being called A is connected.

When the present invention is based on a network in which the H.323 standard is used, the H.323 terminal of the person being called A transfers to the call managing equipment 110a a communication closure message that is transferred to the call managing equipment 110b and to the H.323 terminal of the person being called A.

As long as the communication is not interrupted by the caller B, the call managing equipment 110b performs steps E212 to E213.

When the caller B has interrupted the communication, the algorithm passes to step E214, which consists of stopping the call signal of the user A.

When the present invention is based on an analogue telephone network, the switch to which the telephone set of the person being called A is connected demands the stopping of the call signal.

When the present invention is based on a network in which the H.323 standard is used, the H.323 terminal of the person being called A demands the stopping of the call signal.

It should be noted here that, in another embodiment, when the caller B, in response to the multimedia message transmitted at step E208, has selected the invitation to continue to present the call to the person being called A by pressing a predetermined key on his H.323 terminal or his telephone set or by effecting a voice command, the time delay T2 is deactivated and a time delay denoted T3 is activated by the non-reply server 130.

According to this variant, and when the present invention is based on a network in which the H.323 standard is used, the non-reply management server 130 does not transfer to the call management equipment 110b of the person being called A a message representing the closure of the non-reply session. The non-reply session between the subscriber B and the non-reply server is maintained. As long as the person being called A does not off-hook his terminal or the caller B does not on-hook his terminal, the time delay T3 remains active and, when this has elapsed, the algorithm returns to step E208. At this step, the non-reply server 130 transfers to the caller B a new multimedia message inviting him to make a new choice.

The multimedia message transmitted is preferentially different from the message previously transmitted and comprises the following proposals: leave a message in the message service of the person being called A, make an automatic call back to the person being called A, transfer the call to another terminal such as for example the mobile telephone of the person being called A or the secretariat of the person being called A, or access other options. This is because, if the person being called A does not reply during the time delay T3, it is not necessary to once again invite the caller to present the call to the person being called.

If at step E210 the caller B, in response to the multimedia message transmitted at step E208, has not selected the invitation to continue to present the call to the person being called A, the algorithm passes to step E217.

At this step, the non-reply management server 130 checks whether the caller B has responded to the multimedia message transmitted at step E208 by selecting the invitation to access the messaging server 140 of the person being called A.

The response of the caller B is for example pressing on a predetermined key on his H.323 terminal, which demands the transfer of a signal of the DTMF type or the like intended for the non-reply management server or a voice command interpreted by the non-reply management server 130.

In the affirmative, the algorithm passes to the following step E218.

When the present invention is based on a network in which the H.323 standard is used, the non-reply management server 130 transfers to the call managing equipment 110b of the person being called A a message representing the closure of the communication. The non-reply management server 130 also generates a return message comprising the identifier of another non-reply server and more precisely the identifier of the messaging server 140 to the H.323 terminal of the caller B. The H.323 terminal of the caller B transfers in response, firstly: a communication closure message to the H.323 terminal of the caller B by means of call managing equipment 110 and secondly: a message requesting connection to the messaging server 140 by means of the call managing equipment 110. When the messaging server 140 takes the communication, an off-hook indication message is transmitted to the H.323 terminal of the caller B by means of the call managing equipment 110 and acknowledges this message. The caller B can then leave a voice message intended for the person being called A on the messaging server 140.

Thus, if the response of the caller represents an acceptance to leave a message in the message box of the person being called, the method interrupts the communication between the caller B and the non-reply server 130, interrupts the telephone call from the caller to the person being called and establishes a communication between the caller and another non-reply server such as the messaging server 140 with which the person being called is associated.

When the present invention is based on an analogue telephone network, the non-reply management server 130 transfers the communication to the messaging server 140. The caller B is then invited to leave a message intended for the person being called A.

At step E219, the call managing equipment 110b checks whether the person being called A is replying to the telephone call of the caller B in the same way as that described in step E204.

If the person being called A replies to the call, the algorithm passes to the following step E220, in which the call managing equipment 110b interrupts the communication between the caller and the non-reply server such as the messaging server 140. The call management equipment 110b of the person being called A transfers to the messaging server 140 and to the H.323 terminal of the caller B a message representing the closure of the non-reply session. When the present invention is based on an analogue telephone network, the communication between the caller B and the messaging server 140 is interrupted and the caller B is once again in the call procedure for the person being called A.

At step E221, the call signal of the person being called A is interrupted in the same way as that described at step E205 and a communication is established between the person being called and the caller at step E222.

If the person being called A does not reply to the telephone call, the algorithm passes from step E219 to E223.

Step E223 consists, for the call managing equipment 110b, of checking whether the caller B has interrupted the communication in the same way as that described at step E213.

As long as the communication is not interrupted by the caller B, or the person being called A has replied to the call, the call managing equipment 110b executes steps E219 and E223.

When the caller B has interrupted the communication, the algorithm passes to step E224, which consists of stopping the call signal of the user A.

If the caller B, in response to the multimedia message transmitted at step E208, has not selected the invitation to access the messaging server 140 of the person being called A, the algorithm passes to step E225.

At this step, the non-reply management server 130 checks whether the caller B has replied to the multimedia message transmitted at step E208 by selecting the invitation to make a further call to the person being called A. The response is pressing on a predetermined key on his H.323 terminal or his telephone set or a voice message.

In the affirmative, the algorithm passes to the following step E226, which consists of activating an automatic recall procedure at the end of a predetermined time or a time defined by the caller B.

When the present invention is based on a network in which the H.323 standard is used, the non-reply management server 130 transfers to the call management equipment 110b of the person being called A a message representing the closure of the communication, which is then transferred to the H.323 terminal of the person being called A. When this message is received, the H.323 terminal of the person being called A interrupts the call signal. The non-reply management server 130 transfers to the call management system 110a of the caller B a message representing the closure of the communication that is then transferred to the H.323 terminal of the caller B.

The call management equipment 110a of the caller B enters a waiting loop for a predetermined time and, at the end of this waiting loop, generates a request for connection to the terminal of the caller B and a request for connection to the terminal of the person being called A.

If the caller B, in response to a multimedia message transmitted at step E208, has not selected the invitation to make an automatic recall, the algorithm passes to step E227.

At this step, the call management equipment 110b of the person being called A checks whether the person being called A has taken the communication.

In the affirmative, the algorithm passes to step E228. The call management equipment 110b also transfers a message intended for the non-reply management server 130 representing the closure of the communication with the caller B.

At step E229, the call signal of the person being called A is interrupted.

At step E230, the call management equipment 110b transfers a message indicating that the line has been taken by the person being called A destined for the H.323 terminal of the caller B by means of the call management equipment 110a.

When the message indicating that the line has been taken is received, the person being called A transfers an acknowledgment message to the H.323 terminal of the person being called A. The telephone communication is then established between the two users.

If the person being called A has not taken the communication, the algorithm passes from step E227 to step E231 and the non-reply management server 130 checks whether the time delay T2 activated at step E209 has ended. If not, the algorithm returns to the previously described step E210. In the affirmative, the algorithm passes to step E232.

At this step the communication between the caller B and the non-reply management server 130 is interrupted, as is the call from the person being called A.

When the present invention is based on a network in which the H.323 standard is used, the non-reply management server 130 transfers to the call management equipment 110b of the person being called A a message representing the closure of communication that is then transferred to the H.323 terminal of the person being called A. The non-reply management server 130 transfers to the call management equipment 110a of the caller B a message representing the closure of the communication that is then transferred to the H.323 terminal of the caller B.

Naturally the present invention is in no way limited to the embodiments described here but quite the contrary encompasses any variant within the capability of a person skilled in the art.

The invention claimed is:

1. A method of managing a telephone call from a caller to a person being called by means of a telecommunication network, wherein the method comprises the steps of:
    detecting a non-reply of the person being called to the telephone call for a predetermined length of time,
    establishing a communication between the caller and a non-reply server for transferring a first message inviting the caller to continue to present the call to the person being called, while maintaining the telephone call from the caller to the person being called,
    detecting, by the non-reply server, a response by the caller to said first message, and if the response of the caller to said first message represents an acceptance to continue to resent the call to the person being called, and if a non-reply of the person being called to the telephone call is still detected:
    transferring, from the non-reply server to the caller, at least one second message inviting the caller to make a new choice, wherein said at least one second message is a new message different from said first message previously transferred to the caller,
    detecting a reply of the person being called to the telephone call from the caller, and if the reply of the person being called to the telephone call is detected;
    interrupting the communication between the caller and the non-reply server, and
    establishing communication between the caller and the person being called.

2. The method of claim 1, wherein said first message is adapted to at least one predetermined condition belonging to the group comprising: the identity of the caller, the date at which the call is made, the time at which the call is made, a service to which the person being called has subscribed.

3. The method of claim 1, wherein, if the reply of the person being called represents an acceptance to continue to present the call to the caller, the method also comprises the step of interrupting the communication between the caller and the non-reply server.

4. An non-transitory storage medium, readable by a computer, storing program instructions that can be executed by said computer to implement the method of claim 1.

5. A system for managing a telephone call from a caller to a person being called, wherein the system comprises:
    means of detecting a non-reply of the person being called to the telephone call for a predetermined length of time,
    means of establishing communication between the caller and a non-reply server for transferring a first message inviting the caller to continue to present the call to the person being called, while maintaining the telephone call from the caller to the person being called,
    means of detecting a response by the caller to said first message,
    means of continuing to present the call to the person being called if the response of the caller to said first message represents an acceptance to continue to present the call to the person being called,
    means of transferring, from the non-reply server to the caller, at least one second message inviting the caller to make a new choice if a non-reply of the person being called to the telephone call is still detected, wherein said at least one second message is a new message different from said first message previously transferred to the caller, means of detecting a reply of the person being called to the telephone call from the caller, means of interrupting the communication between the caller and the non-reply server if the reply by the person being called to the telephone call is detected, and means of establishing communication between the caller and the person being called.

6. A system of claim 5, wherein the system comprises means of interrupting the communication between the caller and the non-reply server if the response of the caller represents an acceptance to continue to present the call to the person being called.

7. A system of claim 6, wherein the system comprises means of establishing a communication between the caller and another non-reply server, referred to as the messaging server, with which the person being called is associated.

8. A system for managing a telephone call from a caller to a person being called, wherein the system comprises:

a component configured to detect a non-reply of the person being called to the telephone call for a predetermined length of time, a component configured to establish communication between the caller and a non-reply server for transferring a first message inviting the caller to continue to present the call to the person being called, while maintaining the telephone call from the caller to the person being called, a component configured to detect a response by the caller to said first message, a component configured to continue to present the call to the person being called if the response of the caller to said first message represents an acceptance to continue to present the call to the person being called, a component configured to transfer, from the non-reply server to the caller, at least one second message inviting the caller to make a new choice if a non-reply of the person being called to the telephone call is still detected, wherein said at least one second message is a new message different from said first message previously transferred to the caller, a component configured to detect a reply of the person being called to the telephone call from the caller, a component configured to interrupt the communication between the caller and the non-reply server if the reply by the person being called to the telephone call is detected, and a component configured to establish communication between the caller and the person being called.

* * * * *

UNITED STATES PATENT AND TRADEMARK OFFICE
CERTIFICATE OF CORRECTION

PATENT NO. : 8,498,398 B2
APPLICATION NO. : 11/791817
DATED : July 30, 2013
INVENTOR(S) : Lottin et al.

It is certified that error appears in the above-identified patent and that said Letters Patent is hereby corrected as shown below:

On the Title Page
    Page 1 (item 75, Inventors) at line 3, Change "Iouannec (FR)" for Francois Toutain to --Louannec (FR)--.

In the Specification
    In column 6 at line 51, Change "9.323" to --H.323--.

In the Claims
    In column 10 at line 21, In Claim 1, change "resent" to --present--.

Signed and Sealed this
Twenty-second Day of April, 2014

Michelle K. Lee
*Deputy Director of the United States Patent and Trademark Office*